Oct. 31, 1939.   R. ECKARDT   2,178,115
HAND OPERATED CLAMPING DEVICE FOR MULTIPLE SPINDLE MACHINES
Filed July 27, 1938   2 Sheets-Sheet 1
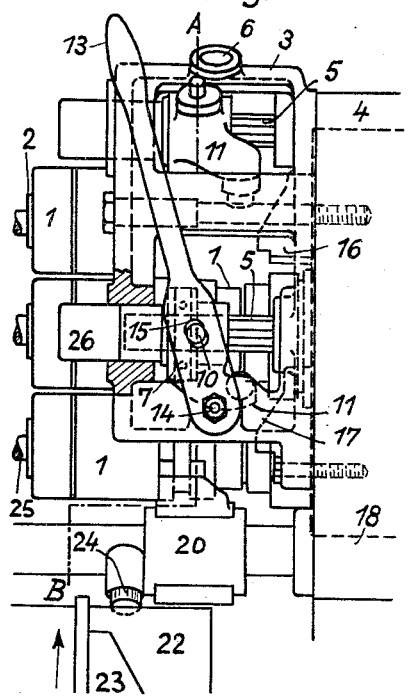
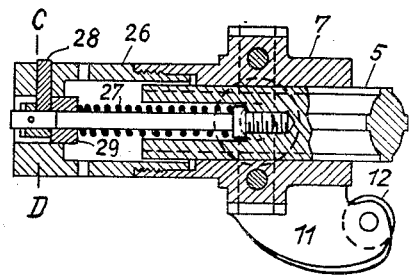
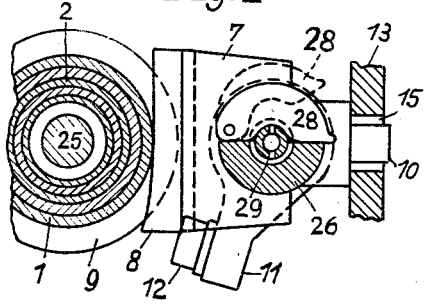
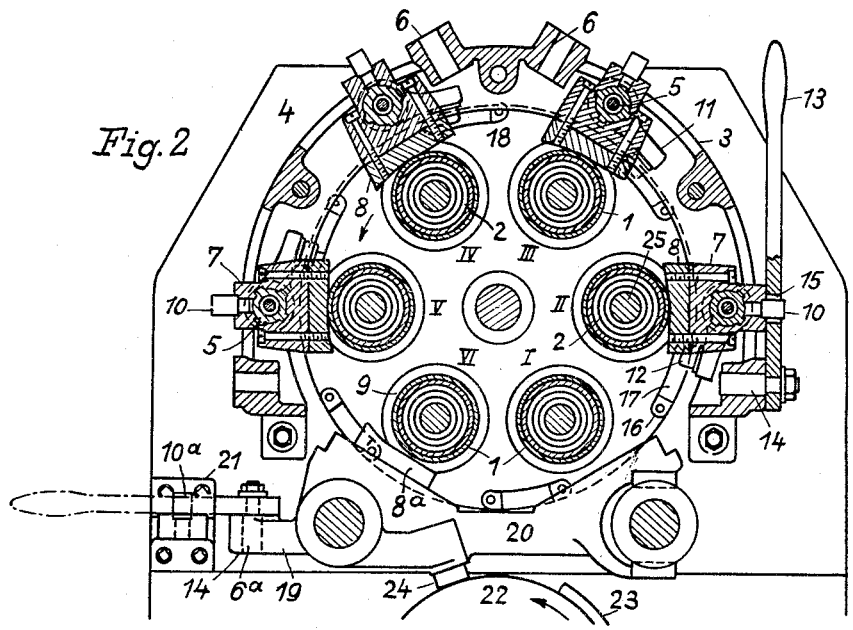
Inventor:
Rudolf Eckardt
BY
Attorney

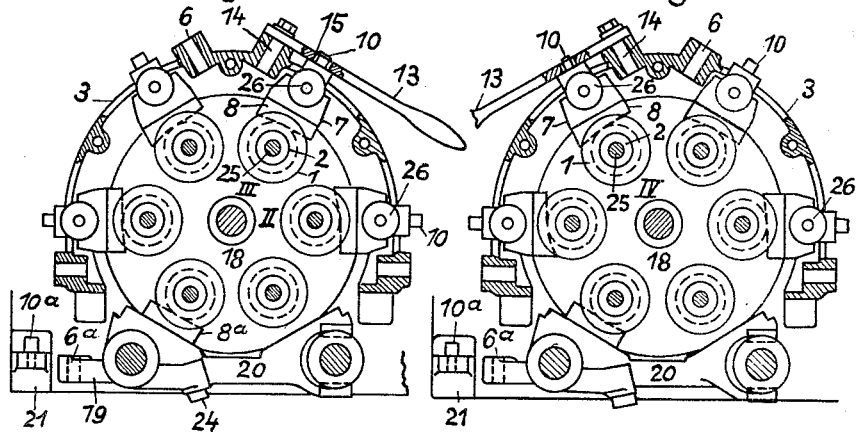

Patented Oct. 31, 1939

2,178,115

UNITED STATES PATENT OFFICE 2,178,115

HAND OPERATED CLAMPING DEVICE FOR MULTIPLE SPINDLE MACHINES

Rudolf Eckardt, Leipzig, Germany, assignor to The National Acme Company, Cleveland, Ohio, a corporation of Ohio Application July 27, 1938, Serial No. 221,524
In Germany August 26, 1937

18 Claims.   (Cl. 29—37)

In known multiple spindle turret lathes in addition to an automatic arrangement for closing and opening the chucking devices on the lower work spindles a separate arrangement is provided which consists of a sleeve shifter or slide movably arranged on the front service side of the machine which after each indexing of the work spindle carrier can be brought by turning movement into engagement with the chucking slide coming into the front station in order to be able to effect opening of the chucking device by hand on adjustment of the tool devices or of the chucking force of the chucking jaws or on any irregularity occuring during the treatment of the work.

Opening and closing of the separate chucking devices by hand can be effected however only in a definite position, which is always the same, of the different work spindles in the spindle carrier so that for example the opening of the chucking devices in the upper or the rear working position cannot be carried out without further work when for example a drill or a reamer has jammed in treatment of the work or has broken off because indexing of the work spindle carrier to the releasing position is not then possible. The opening of a chuck was in these circumstances mostly effected by means of an iron bar serving as a lever which was clamped between the corresponding chucking sleeve and a fixed part of the machine in order to obtain displacement of the chucking sleeve on the corresponding work spindle. However, damage, bending or twisting of parts of the chucking device could not always be avoided.

The object of the present invention is to permit opening and closing of the chucking devices by hand in automatic multiple spindle turret lathes in any working position of the work spindle carrier. For this purpose according to the invention the other working stations are each provided with an arrangement for hand chucking of the chucking devices. The arrangements are preferably actuated by a detachable hand chucking lever adapted to be used in common for all working stations.

Moreover provision is made to ensure that the closing or gripping of the separate chucking devices is effected automatically, if by accident closing of a chucking device by the hand lever is forgotten. Moreover according to the invention on the hand chucking arrangement safety devices are provided by which opening of the chucking devices during operation of turret lathes is avoided.

One embodiment of the invention is illustrated by way of example in the accompanying drawings applied to a six spindle automatic lathe.

Fig. 1 is a front view of the hand chucking lever in conjunction with the front middle chucking sleeve of a six spindle automatic machine with the chucking device closed.

Fig. 2 is a side view of the hand chucking lever in the central front spindle position II and a section on the line A—B of Fig. 1 through the supporting arch for the sleeve shifters.

Fig. 3 is a longitudinal section to enlarged scale through the front middle chucking slide with a safety device preventing automatic release of the chucking device during the operation of the machine.

Fig. 4 is a cross section on the line C—D of Fig. 3 showing the semi-circular locking plate of the safety device.

Fig. 5 is a side view of Fig. 1 with the detachable hand chucking lever in position in the front upper spindle position III.

Fig. 6 the same side elevation with the hand lever in position in the rear upper spindle position IV.

Fig. 7 a similar view with the hand lever in position in the rear middle spindle position V.

Fig. 8 a similar view with the hand lever in position in the rear lower spindle position VI.

Referring to the drawings, on the separate work spindles 2 the chucking sleeves or slides 1 are movably arranged in known manner, Fig. 1. On the housing 4 of the work spindle carrier of the automatic machine is mounted a large supporting arch 3 which is provided with as many guide bars 5 and openings 6 as there are work spindles 2 or chucking sleeves 1 which are not automatically actuated (Fig. 2).

Corresponding to the number of work spindles 2 a number of slide shifters 7 are provided which are movably mounted by means of grooves on the guide bars 5 and are each provided with a tongue 8 each of which engages in the working stations of the spindles in grooves 9 in the slides 1. Each sleeve shifter 7 is provided laterally with a projecting pin 10 as well as with a laterally extending arm 11 and a roll 12, Figs. 1 and 2. A detachable hand chucking lever 13 which has a projecting pin 14 and a slot 15 can effect opening or closing of the corresponding chucking device in each of the upper work spindle positions for example II, III, IV and V by insertion of the pin 14 in the corresponding hole 6 in the supporting arch 3 and placing the slot 15 on the projecting pin 10 of the corresponding sleeve shifter 7 (Figs. 2 to 5). As many indexing dogs 16 as there are work spindles are secured externally of the work spindles on the work spindle drum 18. They serve on indexing of the work spindle drum 18 to bring automatically into chucking position any sleeve shifter 7 not immediately returned to chucking position by pressure against the detained stop roll 12, i. e. they serve as safety dogs.

On the lower automatically actuated chucking slide 20 is provided a separate lug 19 with a hole 6a to receive the pin 14 on the hand chucking lever 13 when the opening of the chucking device has to be effected by hand in one of the two lower work spindle positions I or VI. As a fulcrum for the hand lever 13 there is provided a separate bracket 21 which is provided with a pin 10a which fits the slot 15 in the hand lever 13 as the projecting pin 10 fits the sleeve shifter 7.

On each sleeve shifter 7 is mounted a safety device preventing self-release of the chucking device which consists of a casing 26 for the reception of a long compression spring 27 with a gripping ring 29 and a semi-circular or like locking plate 28 which serves to tension the compression spring 27.

The modus operandi of the hand chucking device in accordance with the invention is hereinafter explained.

In the known multiple spindle automatic machines the automatic displacement of the chucking sleeve or slide 1 is effected only in the lower work spindle position I or VI by the cam drum 22 mounted on the cam shaft, by way of a chucking cam 23, a chucking roll 24 and a lower chucking slide 20. Any necessary re-chucking or adjustment of the gripping jaws by hand could only be effected in a single work spindle position mostly in the work spindle position II by a separate device. If re-chucking or interchange of the gripping jaws of another work spindle was necessary the corresponding chucking device had always to be brought into the work spindle position II because only in this spindle position alone could the interchange of the jaws or the other work grippers be effected.

In the subject of the invention however by means of a single detachable hand chucking lever 13 the opening and closing of the chucking devices can be effected without previous indexing of the work spindle carrier 18 being necessary in order to bring any of the chucking devices into a definite work spindle position.

The opening of the desired chucking device is effected simply by bringing the removable freely movable hand chucking lever 13 with its projecting pin 14 into the corresponding hole 6 provided on the supporting arch 3 so that the slot 15 on the lever 13 engages with the pin 10 provided on the sleeve shifter 7. By displacement of the hand chucking lever 13 to the right the desired chucking device is opened. By displacement of the hand chucking lever 13 to the left, Fig. 1, displacement of the sleeve shifter 7 and thus the displacement of the chucking sleeve 1 and the gripping of the work bar by the tongue 8 are effected.

In the six spindle automatic machine illustrated in the drawings the opening and closing of the separate chucking devices can be effected as desired by the hand chucking lever 13 in every work spindle position from II to V since the hand chucking lever 13 with its pin 14 need simply be inserted in the hole 6 provided for each work spindle position on the arch 3 and brought into engagement with the projecting pin 10 of the corresponding sleeve shifter 7.

Of the two lower chucking devices in the positions I and VI only one of the chucking devices, for example that in position VI, could hitherto be automatically actuated from the cam drum 22. The arrangement according to the invention is however such that also this chucking device can be actuated by hand when the chucking roll 24 is located externally of the cam 23. For this purpose the hand chucking lever 13 with its projecting pin 14 is inserted in the hole 6a of the lower slide 20 so that the slot 15 engages with the pin 10a mounted on a separate bracket 21. By movement of the hand chucking lever 13 in the horizontal direction the lower chucking slide 20 is moved laterally and displaces by means of the tongue 8a the lower sleeve 1 whereby also the lower chucking device in position VI can be opened and closed by hand. A corresponding arrangement can also be provided for the chucking device in position I.

For automatically closing the chucking devices in cases where the operator has forgotten after setting the tool to bring the hand lever 13 into the chucking position, the indexing dogs 16 are screwed to the work spindle drum 18, the projecting cam noses 17 of which on further indexing of the spindle carrier 18 strike against the stop roll 12 on the sleeve shifter 7 displaced or not, act to displace it and thus through the corresponding tongue 8 or 8a effect the displacement of the corresponding sleeve or sleeves 1 to the left whereby automatic gripping of the work bar in the erroneously left-open chucking device or devices is effected.

By a separate safety arrangement between guide bar 5 and sleeve shifter 7 self opening of the chucking devices during operation say due to vibration is prevented, since a compression spring 27 provided between the guide bar 5 and the casing 26 of the sleeve shifter 7 on opening of the corresponding chucking device, i. e. on displacement of the sleeve shifter 7 to the right, is put under tension by a semi-circular locking plate 28 swung forward in front of a ring 29 of the compression spring 27 in the casing 26. On release of the hand chucking lever 13 the compressed spring 27 then forces the sleeve shifter 7 and thus the sleeve 1 again to the left and automatic closing of the chucking device is effected.

By lifting the semi-circular locking plate 28 from the sleeve shifter casing 26 (dotted position in Fig. 4) the spring pressure on the sleeve shifter 7 is released as is necessary for example when on inter-change of the chuck grippers 8 or chuck jaws in the chucking device a longer period of opening of the chucking device is desired.

I claim:

1. In a multiple spindle machine the combination of a spindle carrier having a plurality of work spindles, each being provided with a chuck, a housing for the said spindle carrier, means for automatically opening and closing the said chucks including a cam-shaft, a plurality of hand-operated chucking devices for opening and closing the chucks in any working position of the spindle carrier, and shiftable means carried by said housing, said hand operated clamping device having means for attachment to said shiftable means and to said housing.

2. In a multiple spindle machine the combination of a spindle carrier having a plurality of work spindles, each being provided with a chuck, a housing for the said spindle carrier, means for automatically opening and closing the said chucks including a cam shaft, a supporting arch mounted on the said housing and provided with guide bars and a plurality of hand-operated chucking devices for opening and closing the chucks in any working position of the spindle carrer.

3. In a multiple machine the combination of a spindle carrier having a plurality of work spindles, each being provided with a chuck, having a chucking sleeve, a housing for the said spindle carrier, means for automatically opening and closing the said chucks including a cam shaft, a supporting arch mounted on the said housing and provided with guide bars, a plurality of hand-operated devices for opening and closing the chucks in any working position of the spindle carrier and comprising sleeve shifters adapted to slide on the said guide bars and each provided with a tongue adapted to engage in a groove of the said chucking sleeve.

4. The structure as set forth in claim 3, in which each of the hand-operated devices is adapted to receive a detachable handchucking lever having a projection pin and a slot.

5. The structure as set forth in claim 3, in which the sleeve shifters having each a laterally projecting pin and a laterally extending arm provided with a roll.

6. In a multiple spindle machine the combination of a spindle carrier having a plurality of work spindles, each being provided with a chuck having a chucking sleeve, a housing for the said spindle carrier, means for automatically opening and closing the said chucks including a cam shaft, a supporting arch mounted on the said housing and provided with guide bars and openings for receiving the pin of a detachable hand chucking lever having a projection pin and a slot.

7. In a multiple spindle machine the combination of a spindle carrier having a plurality of work spindles, each being provided with a chuck and having indexing dogs, a cam shaft, a supporting arch mounted on the said housing and provided with guide bars and openings, a plurality of hand-operated chucking devices for opening and closing the chucks in any working position of the spindle carrier and comprising sleeve shifters each having a laterally projecting pin and a laterally extending arm provided with a roll adapted to cooperate with the said indexing dogs.

8. In a multiple spindle machine, a hand chucking lever provided with a slot and a pin, one of which is adapted to be detachably journaled in one member of the machine and the other is adapted to be connected with means carried by the same member for causing the shifting the sleeve shifter of a chuck.

9. In a multiple spindle machine the combination of a spindle carrier having a plurality of work spindles, each being provided with a chuck, a housing for the said spindle carrier, means for automatically opening and closing the said chucks comprising a lower chucking slide provided with a lug having an hole, a plurality of hand-operated chucking devices for opening and closing the chucks in any working position of the spindle carrier and comprising a hand chucking lever having a projection pin and a slot, the said pin being adapted to engage in the said hole.

10. The structure as set forth in claim 7, in which there is provided as a fulcrum for the hand chucking lever a separate bracket provided with a pin adapted to engage in the slot of the hand chucking lever.

11. In a multiple spindle machine the combination of a spindle carrier having a plurality of work spindles, each being provided with a chuck and a chucking sleeve, a housing for the said spindle carrier, a cam shaft, a supporting arch mounted on the said housing and provided with guide bars and openings, a plurality of hand-operated chucking devices for opening and closing the chucks in any working position of the spindle carrier and comprising sleeve shifters adapted to slide on the said guide bars and each provided with a safety device adapted to prevent a self-release of the chucking device.

12. The structure as set forth in claim 9, in which the safety device consists of a casing for the reception of a compression spring and a gripping ring adapted to cooperate with a locking plate.

13. A structure as set forth in claim 11, in which the safety device consists of a casing for the reception of a compression spring and a gripping ring adapted to cooperate with a locking plate having a semi-circular form pivotally mounted, so that by lifting the said locking plate the spring pressure on the sleeve shifter is released.

14. In a multiple spindle machine the combination of a spindle carrier having a plurality of work spindles, each being provided with a chuck, a housing for the said spindle carrier, means for automatically opening and closing the said chucks including a cam shaft, a plurality of hand-operated chucking devices for opening and closing the chucks in any working position of the spindle carrier, and means carried by said housing for attachment of said hand-operated chucking devices, the said automatically operated means being provided with mechanisms for manually controlling the said means by use of a detachable hand chucking lever.

15. In a multiple spindle machine the combination of a spindle carrier having a plurality of work spindles, each being provided with a chuck, a housing for the said spindle carrier, means for automatically opening and closing the said chucks including a cam shaft and a plurality of hand-operated chucking devices for opening and closing the chucks in any working position of the spindle carrier and safety devices on the spindle carrier adapted to close the said chucks on omission of tightening the chucking devices.

16. In a multiple spindle machine the combination of a spindle carrier having a plurality of work spindles, each being provided with a chuck, having a chucking sleeve, a housing for the said spindle carrier, a cam shaft, a supporting arch mounted on the said housing and provided with guide bars and openings, a plurality of hand-operated chucking devices for opening and closing the chucks in any working position of the spindle carrier and comprising sleeve shifters adapted to slide on the said guide bars, the said sleeve shifters being provided with a spring arrangement adapted to restore the said sleeve shifters on release of the hand chucking lever.

17. The structure as set forth in claim 15 in which the spring arrangement is associated with a releasing device adapted to effect an automatic detention of the sleeve shifter and therefore of the chucking device in the open position.

18. The structure set forth in claim 16, in which the spring arrangement is associated with a releasing device adapted to effect an automatic detention of the sleeve shifter and, therefore, the chucking device in the open position, and in which the releasing device consists of a semi-circular shaped pivotally mounted locking plate adapted to release the force of the said spring.

RUDOLF ECKARDT.